United States Patent
Vernekar et al.

(10) Patent No.: US 11,383,718 B1
(45) Date of Patent: Jul. 12, 2022

(54) SYSTEM AND METHOD FOR RELEASING A SELECTABLE ONE-WAY CLUTCH (SOWC) CONSISTENTLY UNDER DIFFERENT OPERATING CONDITIONS

(71) Applicant: GM GLOBAL TECHNOLOGY OPERATIONS LLC, Detroit, MI (US)

(72) Inventors: Pratik Nagesh Vernekar, Wixom, MI (US); Patrick Lennox Kennedy, Royal Oak, MI (US); Roberto Diaz, El Paso, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/234,322

(22) Filed: Apr. 19, 2021

(51) Int. Cl.
| | | |
|---|---|---|
| *B60W 30/19* | (2012.01) | |
| *B60W 10/02* | (2006.01) | |
| *B60W 10/06* | (2006.01) | |
| *B60W 10/11* | (2012.01) | |
| *B60W 50/02* | (2012.01) | |

(52) U.S. Cl.
CPC .......... *B60W 30/19* (2013.01); *B60W 10/026* (2013.01); *B60W 10/06* (2013.01); *B60W 10/11* (2013.01); *B60W 50/0205* (2013.01); *B60W 2510/0241* (2013.01); *B60W 2510/0275* (2013.01); *B60W 2510/107* (2013.01); *B60W 2510/1015* (2013.01); *B60W 2540/10* (2013.01); *B60W 2555/20* (2020.02); *B60W 2710/024* (2013.01); *B60W 2710/0672* (2013.01); *B60W 2710/1005* (2013.01)

(58) Field of Classification Search
CPC ...... B60W 30/19; B60W 10/06; B60W 10/11; B60W 50/0205; B60W 2510/0241; B60W 2510/0275; B60W 2510/1015; B60W 2510/107; B60W 2555/20; B60W 2710/0672; B60W 2710/1005; B60W 2540/10; B60W 10/115
See application file for complete search history.

(56) References Cited

U.S. PATENT DOCUMENTS

| | | | |
|---|---|---|---|
| 9,102,315 B2 * | 8/2015 | Dlugoss | ............. F16H 61/0437 |
| 9,994,225 B1 * | 6/2018 | Lee | ........................ B60W 30/19 |
| 10,030,722 B2 | 7/2018 | Diaz et al. | |
| 2017/0159815 A1 * | 6/2017 | Kline | ...................... F16H 61/21 |

* cited by examiner

*Primary Examiner* — Roger L Pang

(57) ABSTRACT

A system includes a clutch control module, a shift control module, and a torque control module. The clutch control module is configured to generate a release command signal to switch a selectable one-way clutch (SOWC) from a locked state to a freewheel state. When the SOWC is in the locked state, a transmission transfers torque from an engine to a driveline and from the driveline to the engine. When the SOWC is in the freewheel state, the transmission transfers torque from the engine to the driveline and but not from the driveline to the engine. The shift control module is configured to generate a shift command signal to shift the transmission from a first gear to a second gear after the release command signal is generated. The torque control module is configured to increase an output torque of the engine for a period when the shift command signal is generated.

10 Claims, 7 Drawing Sheets

SYSTEM AND METHOD FOR RELEASING A SELECTABLE ONE-WAY CLUTCH (SOWC) CONSISTENTLY UNDER DIFFERENT OPERATING CONDITIONS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for releasing a selectable one-way clutch (SOWC) consistently under different operating conditions.

A transmission transfers torque between an engine and a driveline at various gear ratios. Some transmissions include a SOWC that is switchable between a freewheel state and a locked state. In the freewheel state, the SOWC acts like a regular one-way clutch by transferring torque from the engine to the driveline and not transferring torque from the driveline to the engine. In the locked state, the SOWC transfers torque from the engine to the driveline and from the driveline to the engine.

SUMMARY

An example of a system according to the present disclosure includes a clutch control module, a shift control module, and a torque control module. The clutch control module is configured to generate a release command signal to switch a selectable one-way clutch (SOWC) from a locked state to a freewheel state. When the SOWC is in the locked state, a transmission transfers torque from an engine to a driveline and transfers torque from the driveline to the engine. When the SOWC is in the freewheel state, the transmission transfers torque from the engine to the driveline and does not transfer torque from the driveline to the engine. The shift control module is configured to generate a shift command signal to shift the transmission from a first gear to a second gear after the release command signal is generated. The torque control module is configured to increase an output torque of the engine for a first period when the shift command signal is generated.

In one aspect, the torque control module is configured to control the output torque of the engine based on a torque request during periods before and after the first period, and increase the output torque of the engine to a torque value that is greater than the torque request during the first period.

In one aspect, the torque control module is configured to increase the output torque of the engine from the torque request to a first torque level in a stepped manner and maintain the output torque of the engine at the first torque level during a first portion of the first period, increase the output torque of the engine from the first torque level to a second torque level in a ramped manner during a second portion of the first period, and decrease the output torque of the engine from the second torque level to the torque request during a third portion of the first period.

In one aspect, the torque control module is configured to increase the output torque of the engine at a ramp rate during the second portion of the first period, and determine the first torque level, a duration of the first portion of the first period, and the ramp rate based on an amount of slip in a torque converter that couples the transmission to the engine.

In one aspect, the torque control module is configured to determine the first torque level and the duration of the first portion of the first period further based on an input speed of the transmission, a temperature of fluid in the transmission, and an ambient pressure.

In one aspect, the torque control module is configured to determine the first torque level and the ramp rate further based on a number of previous attempts to shift the transmission from the first gear to the second gear.

In one aspect, the torque control module is configured to start decreasing the output torque of the engine from the second torque level to the torque request when at least one of (i) an amount of torque transferred from the engine to the transmission is greater than a positive threshold torque for a first threshold period and (ii) an amount of slip in the SOWC is greater than a positive slip threshold for a second threshold period.

In one aspect, the torque control module is configured to determine whether the amount of torque transferred from the engine to the transmission is positive based on at least one of the output torque of the engine, an input torque of the transmission, and an amount of slip in a torque converter that couples the transmission to the engine.

In one aspect, the clutch control module is configured to apply a first clutch to engage the first gear of the transmission, start filling a second clutch with hydraulic fluid when the shift command signal is generated, and apply the second clutch to shift the transmission from the first gear to the second gear when the amount of torque transferred from the engine to the transmission is greater than the positive threshold torque for the first threshold period.

In one aspect, when a period that elapses after the shift command signal is generated is equal to a predetermined period, the clutch control module is configured to apply the second clutch and the torque control module is configured to start decreasing the output torque of the engine regardless of whether the amount of torque transferred from the engine to the transmission is positive.

Another example of a system according to the present disclosure includes a clutch control module and a shift control module. The clutch control module is configured to generate a release command signal to switch a selectable one-way clutch (SOWC) from a locked state to a freewheel state. When the SOWC is in the locked state, a transmission transfers torque from an engine to a driveline and transfers torque from the driveline to the engine. When the SOWC is in the freewheel state, the transmission transfers torque from the engine to the driveline and does not transfer torque from the driveline to the engine. The clutch control module is also configured to apply a first clutch to engage a first gear of the transmission, and to apply a second clutch to engage a second gear of the transmission. The shift control module is configured to generate a shift command signal to shift the transmission from the first gear to the second gear through neutral after the release command signal is generated. When the shift command signal is generated, the clutch control module is configured to release the first clutch by decreasing a pressure of hydraulic fluid supplied to the first clutch in a ramped manner over a clutch release period, and to apply the second clutch after the first clutch is released.

In one aspect, the clutch control module is configured to decrease the pressure of hydraulic fluid supplied to the first clutch at a first rate during a first portion of the clutch release period, and decrease the pressure of hydraulic fluid supplied to the first clutch at a second rate during a second portion of the clutch release period. The second rate is less than the first rate.

In one aspect, the first portion of the clutch release period has a first duration, and the second portion of the clutch release period has a second duration that is greater than the first duration.

Another example of a system according to the present disclosure includes a clutch control module and a shift control module. The clutch control module is configured to generate a release command signal to switch a selectable one-way clutch (SOWC) from a locked state to a freewheel state. When the SOWC is in the locked state, a transmission transfers torque from an engine to a driveline and transfers torque from the driveline to the engine. When the SOWC is in the freewheel state, the transmission transfers torque from the engine to the driveline and does not transfer torque from the driveline to the engine. The clutch control module is also configured to apply a first clutch to engage a first gear of the transmission, and to apply a second clutch to engage a second gear of the transmission. After the release command signal is generated, the shift control module is configured to one of (i) generate a first shift command signal to shift the transmission from the first gear directly to the second gear and (ii) generate a second shift command signal to shift the transmission from the first gear to the second gear through neutral.

In one aspect, the shift control module is configured to determine whether to generate the first shift command signal or the second shift command signal based on at least one of (i) whether an amount of torque transferred from the engine to the transmission is greater than a positive threshold torque for a threshold period and (ii) whether a temperature of fluid in the transmission is less than a predetermined temperature.

In one aspect, the shift control module is configured to generate the first shift command signal when at least one of (i) the amount of torque transferred from the engine to the transmission is greater than the positive threshold torque for a threshold period and (ii) the transmission fluid temperature is less than the predetermined temperature, and the shift control module is configured to generate the second shift command signal when (i) the amount of torque transferred from the engine to the transmission is not greater than the positive threshold torque for the threshold period and (ii) the transmission fluid temperature is greater than or equal to the predetermined temperature.

In one aspect, the system further includes a torque control module configured to control an output torque of the engine based on a torque request when the first shift command signal is generated for a first time, and increase the output torque of the engine to a torque value that is greater than the torque request when the first shift command signal is generated for a second time and the SOWC does not release after an attempt to shift the transmission from the first gear directly to the second gear.

In one aspect, when the first shift command signal is generated for the second time, the torque control module is configured to increase the output torque of the engine from the torque request to a first torque level in a stepped manner and maintain the output torque of the engine at the first torque level during a first portion of a first period, increase the output torque of the engine from the first torque level to a second torque level in a ramped manner during a second portion of the first period, and decrease the output torque of the engine from the second torque level to the torque request during a third portion of the first period.

In one aspect, the shift control module is configured to generate the first shift command signal when the SOWC does not release after a first predetermined number of attempts to shift the transmission from the first gear to the second gear through neutral, and generate the second shift command signal when the SOWC does not release after a second predetermined number of attempts to shift the transmission from the first gear directly to the second gear while an output torque of the engine is increased to a torque value that is greater than a torque request.

In one aspect, the system further includes a diagnostic module configured to set a diagnostic trouble code when (i) the SOWC does not release after the first predetermined number of attempts to shift the transmission from the first gear to the second gear through neutral, and (ii) the SOWC does not release after the second predetermined number of attempts to shift the transmission from the first gear directly to the second gear while the output torque of the engine is increased to the torque value that is greater than the torque request.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When a transmission includes a SOWC, a transmission control system commands the SOWC to switch from the locked state to the freewheel state before shifting the transmission from first gear to second gear. Switching the SOWC from the locked state to the freewheel state is referred to as releasing the SOWC. In certain vehicle operating conditions, such as when the torque transferred from the engine to the driveline is low or negative, the SOWC may not release when commanded to do so. In turn, the transmission may not shift from first gear to second gear when commanded to do so.

A transmission control system according to the present disclosure addresses this issue by adjusting the manner in which the transmission shifts from first gear to second gear. In one example, the system temporarily increases the output torque of the engine to release the SOWC, and then the system applies a friction clutch to shift the transmission to second gear. In another example, the system shifts the transmission into neutral to release the SOWC, and ramps down the pressure of hydraulic fluid in a friction clutch as the system releases the friction clutch to shift the transmission to neutral. Either of these two strategies increases the likelihood that the SOWC releases in all operating conditions to enable the transmission to shift from first gear to second gear.

Figure 1:
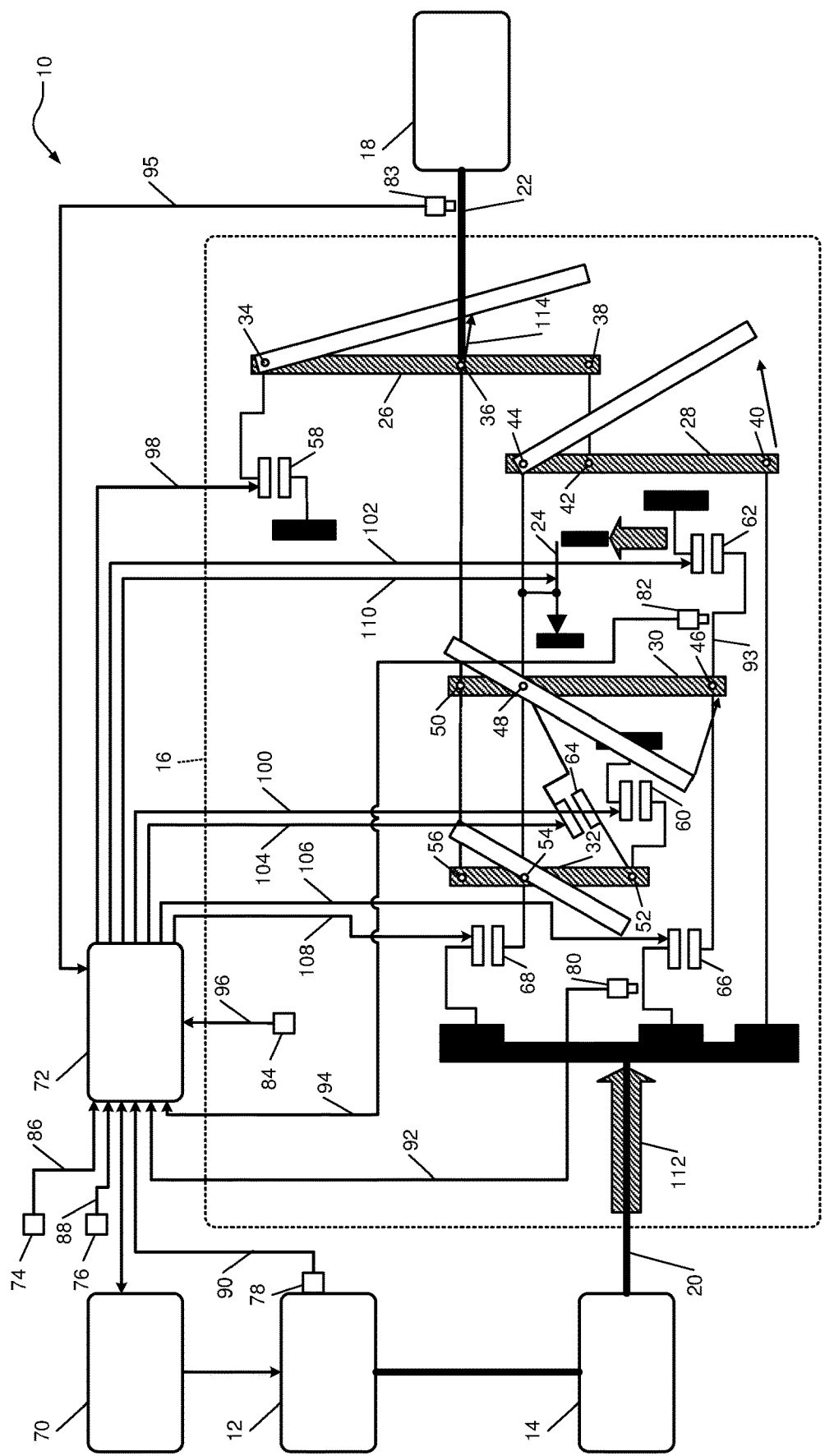
FIG. 1 is a schematic of an example powertrain including a lever diagram of an example transmission according to the present disclosure.

Referring now to FIG. 1, a powertrain system 10 includes an engine 12, a torque converter 14, a transmission 16, and a driveline 18. The engine 12 combusts a mixture of air and fuel to produce drive torque. The torque converter 14 couples the transmission 16 to the engine 12. The transmission 16 transfers torque from the engine 12 to the driveline 18 at one of a plurality of different gear ratios. The driveline 18 rotates wheels (not shown) of a vehicle to propel the vehicle.

The transmission 16 includes an input shaft 20, an output shaft 22, gearsets, friction clutches, and a SOWC 24. Each gearset includes a sun gear, a planet gear carrier, and a ring gear. The transmission 16 is represented using a lever diagram with each gearset represented as a lever, with the sun gear, the planet gear carrier, and the ring gear represented as nodes, and with connections between the gearsets being represented as lines.

The gearsets include a first gearset 26, a second gearset 28, a third gearset 30, and a fourth gearset 32. The first gearset 26 includes a first sun gear 34, a first planet gear carrier 36, and a first ring gear 38. The second gearset 28 includes a second sun gear 40, a second planet gear carrier 42, and a second ring gear 44. The third gearset 30 includes a third sun gear 46, a third planet gear carrier 48, and a third ring gear 50. The fourth gearset 32 includes a fourth sun gear 52, a fourth planet gear carrier 54, and a fourth ring gear 56. The friction clutches include a first friction clutch 58, a second friction clutch 60, a third friction clutch 62, a fourth friction clutch 64, a fifth friction clutch 66, and a sixth friction clutch 68.

An engine control module (ECM) 70 adjusts an output torque of the engine 12 based on a driver torque request. The driver torque request is generated based on a position of an accelerator pedal (not shown) and/or a set speed of a cruise control system (not shown). The ECM 70 adjusts the output torque of the engine 12 by adjusting one or more of the following operating parameters of the engine 12: spark timing, an amount of air delivered to each cylinder during each engine cycle (air per cylinder), fuel injection timing, and fuel injection amount.

A transmission control module (TCM) 72 controls the transmission 16 based on inputs from sensors and the ECM 70. The sensors include a vehicle speed sensor 74, an ambient pressure sensor 76, an engine speed sensor 78, a transmission input speed sensor 80, a transmission intermediate speed sensor 82, a transmission output speed sensor 83, and a transmission fluid temperature sensor 84. The vehicle speed sensor 74 measures the speed of the vehicle and generates a vehicle speed signal 86 indicating the vehicle speed.

The ambient pressure sensor 76 measures ambient pressure and generates an ambient pressure signal 88 indicating the ambient pressure. The engine speed sensor 78 measures the speed of the engine 12 and generates an engine speed signal 90 indicating the engine speed. The transmission input speed sensor 80 measures the speed of the input shaft 20 of the transmission 16 and generates a transmission input speed signal 92 indicating the transmission input shaft speed.

The transmission intermediate shaft sensor 82 measures the speed of an intermediate shaft 93 of the transmission 16 and generates a transmission intermediate speed signal 94 indicating the transmission intermediate speed. The transmission output speed sensor 80 measures the speed of the output shaft 22 of the transmission 16 and generates a transmission output speed signal 95 indicating the transmission output shaft speed. The TCM 72 uses the transmission intermediate and output speeds to determine SOWC slip, which is discussed below with reference to FIGS. 7 and 8. The transmission fluid temperature sensor 84 measures the temperature of fluid in the transmission 16 and generates a transmission fluid temperature signal 96 indicating the transmission fluid temperature.

The TCM 72 adjusts the gear ratio of the transmission 16 based on operating parameters of the vehicle, such as the vehicle speed, using a shift schedule. The TCM 72 adjusts the gear ratio of the transmission 16 by applying and releasing the friction clutches. The TCM 72 shifts the transmission 16 to first gear by applying only the first friction clutch 58 (i.e., without applying the friction clutches 60, 62, 64, 66, 68), although the SOWC 24 may also be applied when the transmission 16 is in first gear. The TCM 72 shifts the transmission 16 to second gear by applying the first and second friction clutches 58 and 60. The TCM 72 shifts the transmission 16 to third gear by applying the first and third friction clutches 58 and 62 and releasing the second friction clutch 60. The TCM 72 shifts the transmission 16 to fourth gear by applying the first and fourth friction clutches 58 and 64 and releasing the third friction clutch 62.

The TCM 72 shifts the transmission 16 to fifth gear by applying the first and fifth friction clutches 58 and 66 and releasing the fourth friction clutch 64. The TCM 72 shifts the transmission 16 to sixth gear by applying the first and sixth friction clutches 58 and 68 and releasing the fifth friction clutch 66. The TCM 72 shifts the transmission 16 to seventh gear by applying the fifth and sixth friction clutches 66 and 68 and releasing the first friction clutch 58. The TCM 72 shifts the transmission 16 to eighth gear by applying the third and sixth friction clutches 62 and 68 and releasing the fifth friction clutch 66. The TCM 72 shifts the transmission 16 to ninth gear by applying the second and sixth friction clutches 60 and 68 and releasing the third friction clutch 62.

The TCM 72 releases and applies the friction clutches by outputting control signals to the friction clutches that indicate a target pressure of hydraulic fluid within the friction clutches. The TCM 72 outputs a first clutch control signal 98 to control actuation of the first friction clutch 58. The TCM 72 outputs a second clutch control signal 100 to control actuation of the second friction clutch 60. The TCM 72 outputs a third clutch control signal 102 to control actuation of the third friction clutch 62. The TCM 72 outputs a fourth clutch control signal 104 to control actuation of the fourth friction clutch 64. The TCM 72 outputs a fifth clutch control signal 106 to control actuation of the fifth friction clutch 66. The TCM 72 outputs a sixth clutch control signal 108 to control actuation of the sixth friction clutch 68.

The TCM 72 outputs a SOWC control signal 110 to switch the SOWC 24 between a locked state and a freewheel state. When the SOWC 24 is in the locked state, the transmission 16 transfers torque from the engine 12 to the driveline 18 and from the driveline 18 to the engine 12. When the SOWC 24 is in the freewheel state, the transmission 16 transfers torque from the engine 12 to the driveline 18 but does not transfer torque from the driveline 18 to the engine 12.

The TCM 72 switches the SOWC 24 to the locked state when torque transfer from the driveline 18 to the engine 12 is desired, such as when performing engine braking. The TCM 72 switches the SOWC 24 to the freewheel state when torque transfer from the driveline 18 to the engine 12 is not desired, such as when shifting the transmission 16. Switching the SOWC 24 from the locked state to the freewheel state is referred to as releasing the SOWC 24, and switching the SOWC 24 from the freewheel state to the locked state is referred to as locking or applying the SOWC 24.

The SOWC 24 may not release in certain vehicle operation conditions, such as when the vehicle is rolling downhill, the transmission 16 is in first gear, and the transmission fluid temperature is low. If the SOWC 24 is not in the freewheel state when an attempt is made to shift the transmission 16 from first gear to second gear, the transmission 16 may not shift into second gear. As a result, the transmission 16 may be stuck in first gear until the vehicle operating conditions change.

FIG. 1 illustrates power flow through the transmission 16 when the transmission 16 is in first gear. The gearsets 26-32 are represented using levers with a non-white fill to show their static states. The gearsets 26-32 are represented using levers with a white fill when the transmission 16 is in first gear, the output torque of the engine 12 is positive, and the speed of the output shaft 22 is greater than zero. In this condition, the levers are rotated clockwise or counterclockwise relative to their static states, which indicates the direction of rotation of the corresponding gearset. In addition, the amount by which the levers are rotated indicates the magnitude of the angular velocity of the corresponding gearsets.

The output torque of the engine 12 is an input torque 112 to the transmission 16. The input torque 112 is transmitted to the second sun gear 40, which causes power to be transmitted to the second planet gear carrier 42 because the second ring gear 44 is locked against a forward strut 268 (FIG. 7) of the SOWC 24. This power transfer is indicated by rotation of the lever representing the second gearset 28 in the counterclockwise direction. Since the first friction clutch 58 is locked (or applied), the power flowing through the second planet gear carrier 42 and the first ring gear 38 is transmitted to the first planet gear carrier 36 and thereby to the output shaft 22 of the transmission 16. This power transfer is indicated by rotation of the lever representing the first gearset 26 in the counterclockwise direction.

If the vehicle is traveling downhill with low engine torque, an output torque 114 is generated due to the inertia of the rolling vehicle that is not generated by the engine 12. In this case, the output torque 114 tends to pull the third and fourth ring gears 50 and 56 and the first planet gear carrier 36 to a higher angular velocity, as indicated by rotation of the levers representing the third and fourth gearset 30 and 32 in the clockwise direction. If one or more clutches have some torque capacity due to cold drag, the resultant reaction is that the SOWC 24 tends to become loaded on a reverse strut 270 (FIG. 9), which causes release inconsistency. As discussed below with reference to FIGS. 7-9, a selector plate 272 of the SOWC 24 may be unable to consistently push the reverse strut 270 down in this scenario.

The TCM 72 addresses this issue by adjusting the manner in which the transmission 16 shifts from first gear to second gear. In one example, the TCM 72 temporarily increases the output torque of the engine 12 to a level that is greater than the driver torque request to release the SOWC 24, and then the TCM 72 applies the second friction clutch 60 to shift the transmission 16 to second gear. In another example, the TCM 72 shifts the transmission 16 into neutral to release the SOWC 24, and ramps down the pressure of hydraulic fluid in the first friction clutch 58 as the TCM 72 releases the first friction clutch 58 to shift transmission 16 to neutral. Either of these two strategies increases the likelihood that the SOWC 24 releases to enable the transmission 16 to shift from first gear to second gear.

Figure 2:
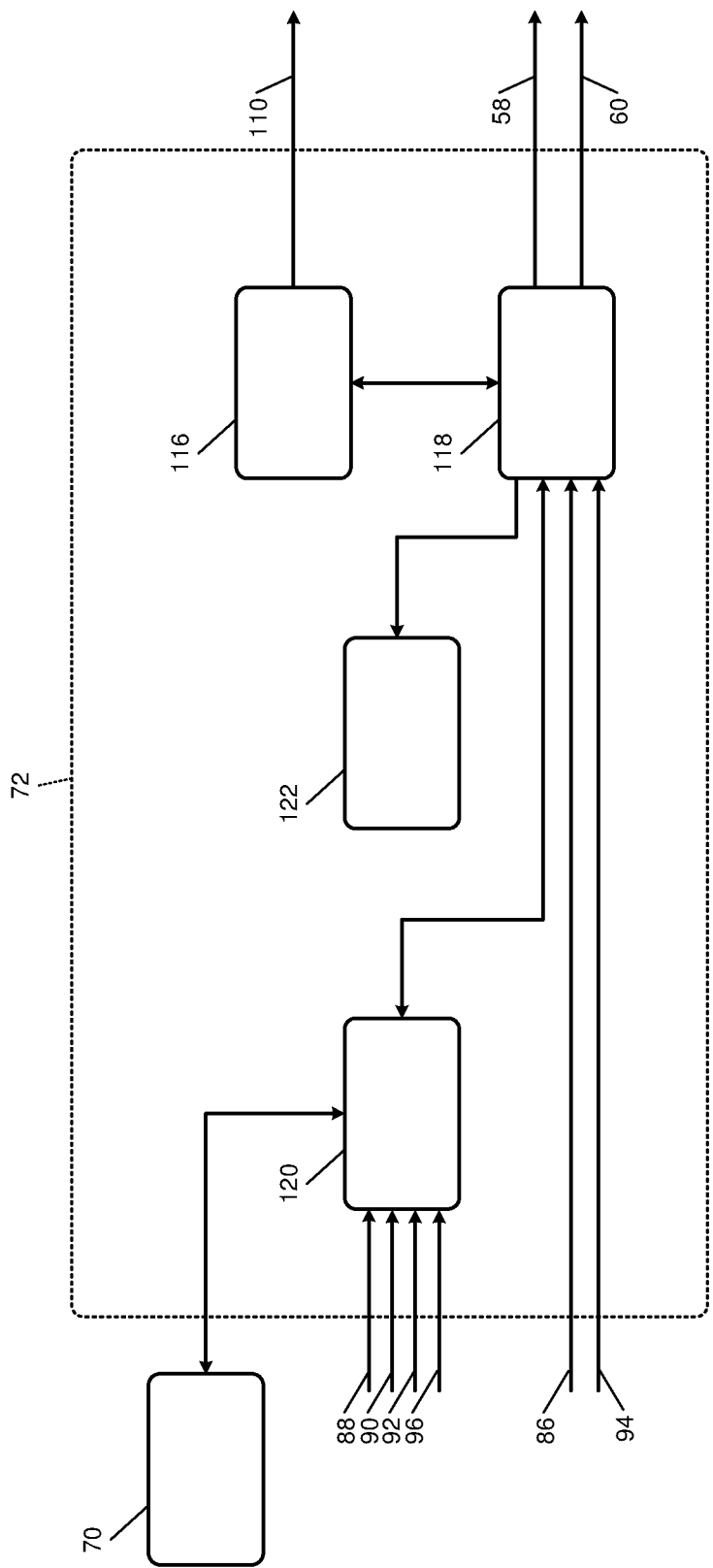
FIG. 2 is a functional block diagram of an example transmission control module according to the present disclosure.

Referring now to FIG. 2, an example implementation of the TCM 72 includes a SOWC control module 116, a shift control module 118, a torque control module 120, and a diagnostic module 122. The SOWC control module 116 commands the SOWC 24 to switch between the locked state and the freewheel state by outputting the SOWC control signal 110. The SOWC control module 116 commands the SOWC 24 to release when the transmission 16 is in first gear and before the shift control module 118 attempts to shift the transmission 16 from first gear to second gear. The SOWC control module 116 commands the SOWC 24 to lock when an attempt to shift the transmission 16 from first gear to second gear is unsuccessful because the SOWC 24 did not release as commanded. The SOWC control module 116 may determine when the shift control module 118 is about to attempt to shift the transmission 16 from first gear to second gear, and whether the SOWC 24 released during the shift, based on an input from the shift control module 118.

The shift control module 118 shifts the transmission 16 to first gear by applying the first friction clutch 58. The shift control module 118 shifts the transmission 16 to second gear by applying the first and second friction clutches 58 and 60 after the SOWC control module 116 releases the SOWC 24. The shift control module 118 controls actuation of the first and second friction clutches 58 and 60 by outputting the first and second clutch control signals 98 and 100, respectively.

In some situations, the shift control module 118 shifts the transmission 16 from first gear directly to second gear. The shift control module 118 accomplishes this by applying the second friction clutch 60 while keeping the first friction clutch 58 applied and after the SOWC control module 116 releases the SOWC 24. In other situations, the shift control module 118 shifts the transmission 16 from first gear to second gear through neutral to ensure that the SOWC 24 releases. The shift control module 118 accomplishes this by releasing the first friction clutch 58 to shift from first gear to neutral while the SOWC control module 116 releases the SOWC 24, and then applying the first and second friction clutches 58 and 60 to shift from neutral to second gear. In various implementations, the SOWC control module 116 may be incorporated into the shift control module 118, in which case the shift control module 118 may perform all of the functions that the SOWC control module 116 is described as performing herein.

When the transmission 16 is shifted from first gear directly to second gear, the torque control module 120 may temporarily increase the output torque of the engine 12 to a torque level that is greater than the driver torque request to ensure that the SOWC 24 releases. In one example, the torque control module 120 temporarily increases the engine output torque to the torque level during a second or subsequent attempt to shift the transmission 16 from first gear directly to second gear after an initial attempt to do so is unsuccessful. The torque control module 120 temporarily increases the engine output torque to the torque level by instructing the ECM 70 to do so. The torque control module 120 may receive the driver torque request from the ECM 70 and determine the torque level based thereon.

The torque control module 120 also determines whether a positive torque condition is met. The positive torque condition is met when an amount of torque transferred from the engine 12 to the transmission 16 is greater than a positive threshold torque for a threshold period. The positive threshold torque and the threshold period may be predetermined and/or calibratable. The shift control module 118 may determine whether to shift the transmission 16 from first gear directly to second gear, or from first gear to second gear through neutral, based on whether the positive torque condition is met. In addition, when shifting the transmission 16 from first gear directly to second gear, the shift control module 118 may apply the second friction clutch 60 when the positive torque condition is met.

When the SOWC 24 does not release during an attempt to shift the transmission 16 from first gear to second gear, the diagnostic module 122 sets a diagnostic trouble code indicating that there is an issue with shifting the transmission 16. When setting the diagnostic trouble code, the diagnostic module 122 may control a user interface device (not shown) to generate a message indicating that there is an issue with shifting the transmission 16. The diagnostic module 122 may control the user interface device by outputting a message control signal indicating the message to be generated by the user interface device. The message may include a visual message (e.g., text, a light, and/or a symbol), an audible message (e.g., a chime), and/or a tactile message (e.g., a vibration). The user interface device may be disposed within a cabin of the vehicle and may include an electronic display (e.g., a touchscreen), a speaker, and/or a vibrating motor.

Figure 3:
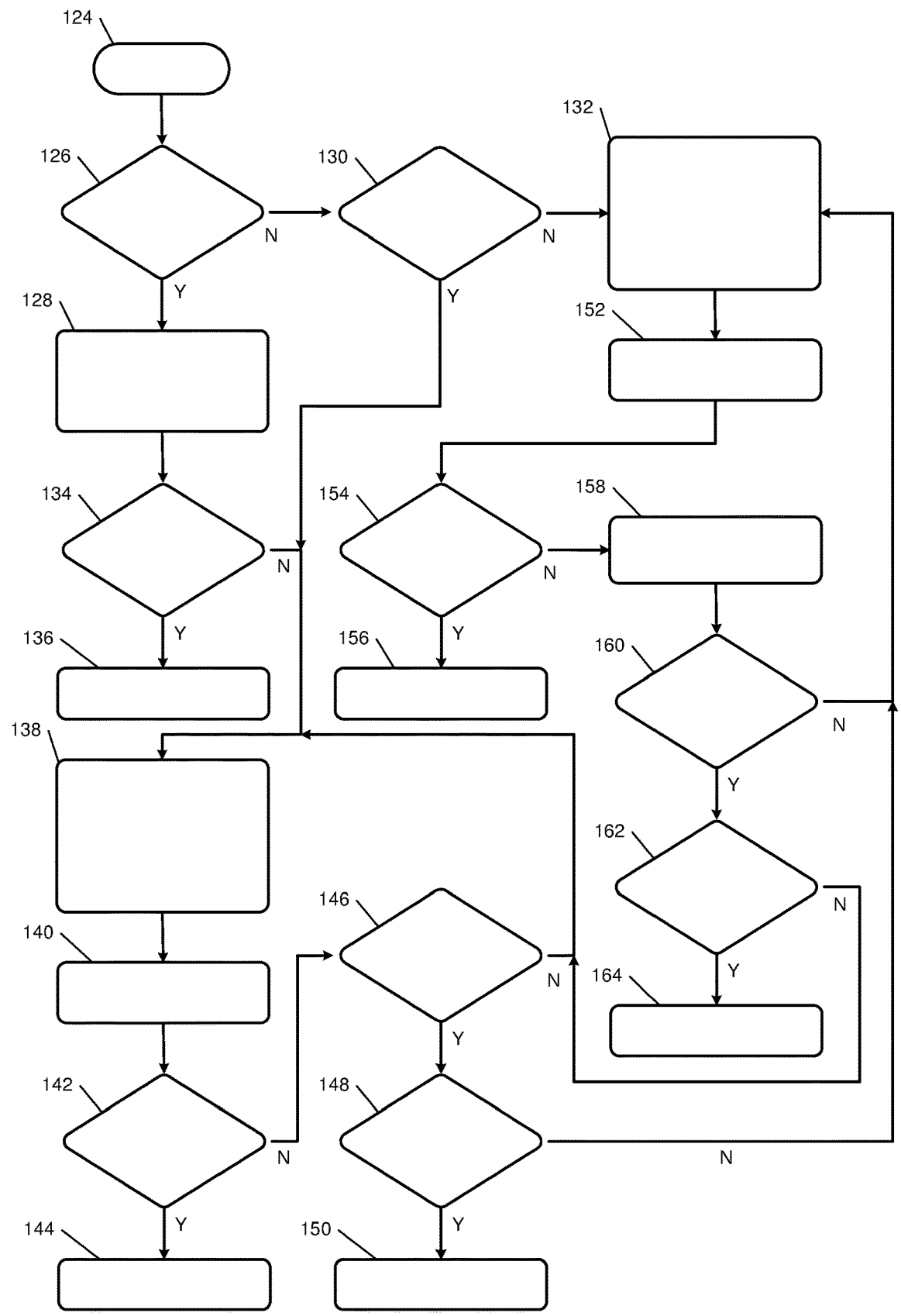
FIGS. 3 and 4 are flowcharts illustrating an example method for releasing a selectable one-way clutch (SOWC) according to the present disclosure.

Referring now to FIG. 3, a method for releasing the SOWC 24 as the transmission is shifted from first gear to second gear begins at 124. In the description of the methods set forth below, the modules of FIG. 2 perform the steps of the methods. However, the particular modules that perform the steps of the methods may differ from the description below. Additionally or alternatively, one or more steps of the methods may be performed independent of any module.

At 126, the torque control module 120 determines whether a positive torque condition is met. The positive torque condition is met when an amount of torque transferred from the engine 12 to the transmission 16 is greater than the positive threshold torque for the threshold period. If the positive torque condition is met, the method continues at 128. Otherwise, the method continues at 130.

At 130, the torque control module 120 determines whether the transmission fluid temperature is less than a temperature threshold. The temperature threshold may be predetermined and/or within a range from 40 degrees Celsius (° C.) to 50° C. If the transmission fluid temperature is less than the temperature threshold, the method continues at 138. Otherwise, the method continues at 132.

At 128, the shift control module 118 performs one regular power-on upshift from first gear locked to second gear. More specifically, the shift control module 118 shifts the transmission from first gear directly to second gear without going through neutral and without increasing the output torque of the engine 12 to a torque level that is greater than the driver torque request. Power-on means that the output power of the engine 12 is greater than zero, and first gear locked means that the transmission 16 is in first gear with the SOWC 24 in the locked state. Before shifting the transmission 16 to second gear, the shift control module 118 releases the SOWC 24 to shift the transmission to first gear freewheel. First gear freewheel means that the transmission 16 is in first gear with the SOWC 24 in the freewheel state.

At 134, the shift control module 118 determines whether the SOWC 24 released during the regular power-on upshift from first gear locked to second gear. The shift control module 118 may determine that the SOWC 24 released when the positive torque condition is met and/or when the SOWC slip is greater than a positive slip threshold for a threshold period. The positive threshold torque and the threshold period may be predetermined and/or calibratable. The shift control module 118 determines the SOWC slip based on the intermediate shaft speed indicated by the transmission intermediate shaft speed signal 94 and the transmission output shaft speed indicated by the transmission output speed signal 95. If the SOWC 24 released, the method continues at 136. Otherwise, the method continues at 138. At 136, the diagnostic module 122 does not set a diagnostic trouble code indicating that there is an issue with shifting the transmission 16.

At 138, the shift control module 118 performs a power-on upshift from first gear locked to second gear with a torque blip and an oncoming clutch fill delay. More specifically, the shift control module 118 shifts the transmission from first gear directly to second gear while temporarily increasing the output torque of the engine 12 to a torque level that is greater than the driver torque request. In addition, the shift control module 118 delays filling the second friction clutch 60 (the oncoming clutch) to allow the engine torque to increase before the second friction clutch 60 is applied.

At 140, the shift control module 118 increases a first counter by one. The first counter indicates the number of attempts to perform a power-on upshift from first gear locked to second gear with a torque blip and an oncoming clutch fill delay. At 142, the shift control module 118 determines whether the SOWC 24 released during the power-on upshift from first gear locked to second gear with a torque blip and an oncoming clutch fill delay. If the SOWC 24 released, the method continues at 144. Otherwise, the method continues at 146. At 144, the diagnostic module 122 does not set the diagnostic trouble code.

At 146, the shift control module 118 determines whether the first counter is greater than or equal to a first counter threshold (e.g., two). The first counter threshold may be predetermined to avoid overheating the second friction clutch 60. If the first counter is greater than or equal to the first counter threshold, the method continues at 148. Otherwise, the method returns to 138.

At 148, the shift control module 118 determines whether a second counter is greater than or equal to a second counter threshold. The second counter indicates the number of attempts to perform a power-on upshift from first gear locked to second gear through neutral with a ramped clutch release. The second counter threshold may be predetermined and/or within a range from three to six. If the second counter is greater than or equal to the second counter threshold, the method continues at 150. Otherwise, the method continues at 132. At 150, the diagnostic module 122 sets the diagnostic trouble code.

At 132, the shift control module 118 performs a power-on upshift from first gear locked to second gear through neutral with a ramped release of the offgoing clutch. More specifically, before shifting the transmission 16 to second gear, the shift control module 118 releases the SOWC 24 to shift the transmission to first gear freewheel. In addition, the shift control module 118 shifts the transmission 16 from first gear freewheel to neutral and releases the first friction clutch 58 (the offgoing clutch) in a ramped manner when doing so. At 152, the shift control module 118 increments the second counter by one.

At 154, the shift control module 118 determines whether the SOWC 24 released when the transmission 16 was shifted to neutral. If the SOWC 24 released, the method continues at 156. Otherwise, the method continues at 158. At 156, the diagnostic module 122 does not set the diagnostic trouble code. At 158, the shift control module 118 reapplies the first friction clutch 58 and performs a break latch. When performing the break latch, the shift control module 118 pulses the pressure of hydraulic fluid in the sixth friction clutch 68 to release a latch valve in the transmission 16.

At 160, the shift control module 118 determines whether the second counter is greater than or equal to the second counter threshold. If the second counter is greater than or equal to the second counter threshold, the method continues at 162. Otherwise, the method returns to 132. At 162, the shift control module 118 determines whether the first counter is greater than or equal to the first counter threshold. If the first counter is greater than or equal to the first counter threshold, the method continues at 164. Otherwise, the method continues at 138.

At 164, the diagnostic module 122 sets the diagnostic trouble code. In addition, the diagnostic module 122 may control the user interface device to generate a message indicating that there is an issue with shifting the transmission 16. The message may include a visual message (e.g., text, a light, and/or a symbol), an audible message (e.g., a chime), and/or a tactile message (e.g., a vibration).

Figure 4:
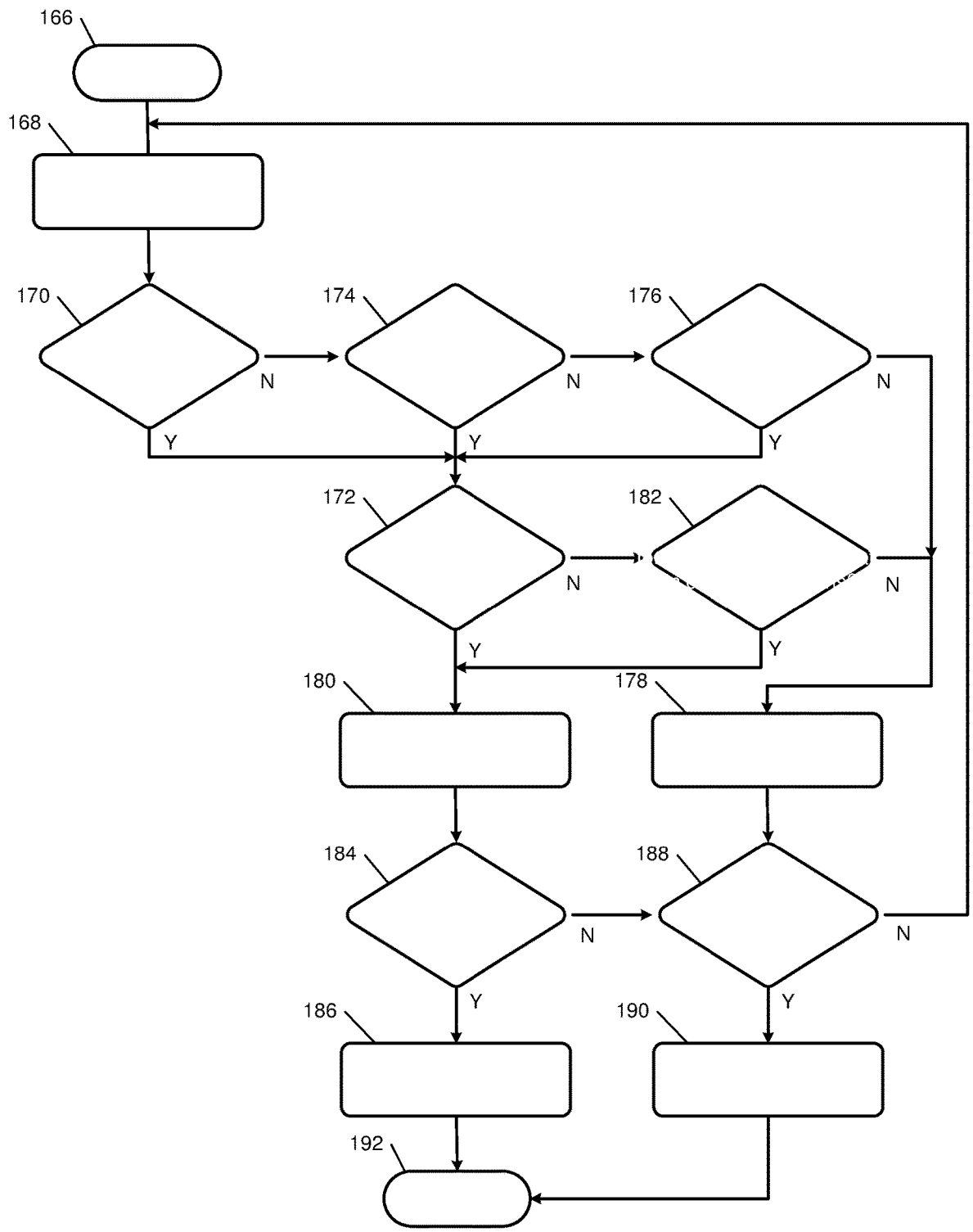

Referring now to FIG. 4, a method for determining whether the positive torque condition is met begins at 166. The method of FIG. 4 may be performed at any one of 126, 128, 132, 138 of FIG. 3. The method of FIG. 4 may begin when the shift control module 118 starts to fill the second friction clutch 60 with hydraulic fluid to apply the second friction clutch 60 and thereby shift the transmission 16 to second gear. At 168, the torque control module 120 increments a clutch fill timer.

At 170, the torque control module 120 determines whether a converter model engine torque is greater than a first positive threshold torque, which may be predetermined and/or calibratable. The converter model engine torque is positive when an input torque of the torque converter 14 is greater than an output torque of the torque converter 14. The input torque of the torque converter 14 is equal to the output torque of the engine 12, and the output torque of the torque converter 14 is equal to the input torque of the transmission 16. If the converter model engine torque is greater than the first positive threshold torque, the method continues at 172. Otherwise, the method continues at 174.

The torque control module 120 may estimate the engine output torque based on operating parameters of the engine 12 such as spark timing, air per cylinder, fuel injection timing, and fuel injection amount. The torque control module 120 receives the engine operating parameters from the ECM 70. The torque control module 120 may estimate the transmission input torque based on the engine output torque and pumping losses in the torque converter 14. The torque control module 120 may estimate the pumping losses in the torque converter 14 based on vehicle operating parameters, such as the speed of the engine 12 and the speed of the transmission input shaft 20, using a function or mapping.

At 174, the torque control module 120 determines whether the transmission input torque is greater than a second positive threshold torque, which may be predetermined and/or calibratable. If the transmission input torque is greater than the second positive torque, the method continues at 172. Otherwise, the method continues at 176.

At 176, the torque control module 120 determines whether slip in the torque converter 14 is greater than a positive slip threshold, which may be predetermined and/or calibratable. Torque converter slip is a difference between the speed of a pump in the torque converter 14 and the speed of a turbine in the torque converter 14. The pump speed is equal to the engine speed, and the turbine speed is equal to the transmission input shaft speed. Thus, the torque control module 120 determines the torque converter slip by determine a difference between the engine speed and the transmission input shaft speed. The torque control module 120 receives the engine speed and the transmission input shaft speed via the engine speed signal 90 and the transmission input speed signal 92, respectively. If the torque converter slip is greater than the positive slip threshold, the method continues at 172. Otherwise, the method continues at 178.

At 172, the torque control module 120 determines whether all torque indicators are positive. The torque indicators include the converter model engine torque, the transmission input torque, and the torque converter slip. If all of the torque indicators are positive, the method continues at 180. Otherwise, the method continues at 182.

At 182, the torque control module 120 determines whether those of the torque indicator(s) that are positive, if any, are accurate in the current vehicle operating conditions. For example, the converter model engine torque may be a more accurate indicator of whether the positive torque condition is met than the other torque indicators when the transmission fluid temperature is less than or equal to 0° C. If the positive torque indicator(s) are more accurate than the other torque indicators in the current vehicle operating conditions, the method continues at 180. Otherwise, the method continues at 178.

At 180, the torque control module 120 increments a positive torque timer. At 184, the torque control module 120 determines whether the positive torque timer is greater than a first threshold period. If the positive torque timer is greater than the first threshold period, the method continues at 186. Otherwise, the method continues at 188. At 186, the torque control module 120 determines that the positive torque condition is met.

At 178, the torque control module 120 does not increment the positive torque timer. At 188, the method determines whether the clutch fill timer is greater than a second threshold period. Each of the first and second threshold periods may be predetermined. If the clutch fill timer is greater than the second threshold period, the method continues at 190. Otherwise, the method returns to 168. At 190, the torque control module 120 determines that the positive torque condition is not met. The method ends at 192.

Figure 5:
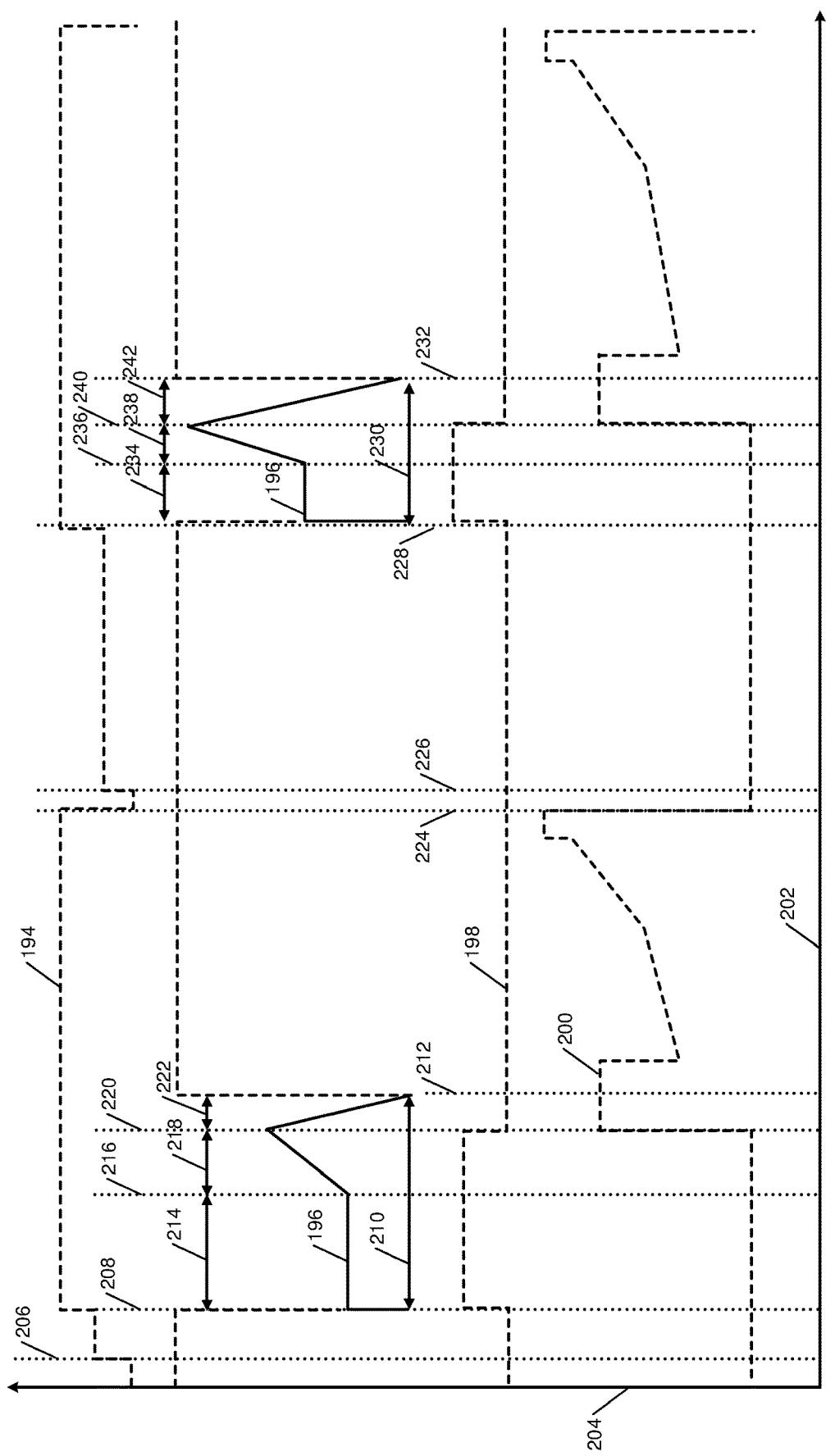
FIGS. 5 and 6 are graphs illustrating example control signals for releasing a SOWC according to the present disclosure.

FIG. 5 illustrates an example of control signals output by the TCM 170 to shift the transmission 16 from first gear directly to second gear while temporarily increasing the engine torque output. The control signals include a commanded gear signal 194, a torque request signal 196, a delay flag signal 198, and a clutch pressure signal 200. The control signals are plotted with respect to an x-axis 202 that represents time and a y-axis 204 that represents magnitude.

At a time 206, the shift control module 118 (or the SOWC control module 116) increases the magnitude of the commanded gear signal 194 to command the transmission 16 to shift from first gear locked to first gear freewheel. At a time 208, the shift control module 118 increases the magnitude of the commanded gear signal 194 to command the transmission 16 to shift from first gear freewheel to second gear. In addition, the shift control module 118 increases the magnitude of the delay flag signal 198 (e.g., activates a shift delay flag) to delay the application of the second friction clutch 60.

Furthermore, during a first period 210 between the time 208 and a time 212, the torque control module 120 adjusts the magnitude of the torque request signal 196 to increase the engine output torque to a torque level that is greater than a driver torque request. Immediately before and after the first period 210, the torque control module 120 adjusts the magnitude of the torque request signal 196 to a default value. In response, the ECM 70 controls the output torque of the engine 12 based on the driver torque request and independent of the torque request signal 196.

At the time 208, the torque control module 120 increases the engine output torque from the driver torque request to a first torque level in a stepped manner. During a first portion 214 of the first period 210 from the time 208 to a time 216, the torque control module 120 maintains the engine output torque at the first torque level. During a second portion 218 of the first period 210 from the time 216 to a time 220, the torque control module 120 increases the engine output torque from the first torque level to a second (or peak) torque level at a first ramp rate and in a ramped manner. During a third portion 222 of the first period 210 from the time 220 to the time 212, the torque control module 120 decreases the engine output torque from the second torque level to the driver torque request in a ramped manner.

In addition, at the time 220, the shift control module 118 decreases the magnitude of the delay flag signal 198 (e.g., deactivates the shift delay flag) and increases the magnitude of the clutch pressure signal 200. The clutch pressure signal 200 indicates a target pressure of hydraulic fluid within the second friction clutch 60. Thus, increasing the magnitude of the clutch pressure signal 200 increases the pressure of hydraulic fluid within the second friction clutch 60 in order to apply the second friction clutch 60 to shift the transmission 16 to second gear. The period from the time 208 to the time 220 may be referred to as a clutch fill delay time.

The torque control module 120 may determine the first torque level, the duration of the first portion 214 of the first period 210, and the first ramp rate based on the torque converter slip and/or the number of previous attempts to shift the transmission 16 from first gear directly to second gear. Additionally or alternatively, the torque control module 120 may determine the first torque level and the duration of the first portion 214 of the first period 210 based on the transmission input speed, the transmission fluid temperature, and the ambient pressure. The torque control module 120 may start decreasing the engine output torque from the second torque level to the driver torque request when the positive torque condition is met, when the SOWC slip is greater than a positive slip threshold for a threshold period, and/or when the clutch fill delay time is greater than or equal to a clutch fill delay timeout (e.g., a predetermined period of 0.9 seconds).

In this example, the first period 210 corresponds to the first attempt to shift the transmission 16 from first gear directly to second gear. Thus, the number of previous attempts to shift the transmission 16 from first gear directly to second gear is zero. However, the SOWC 24 does not release during the first attempt, and therefore the transmission 16 does not shift from first gear to second gear. Thus, at a time 224, the shift control module 118 decreases the magnitude of the clutch pressure signal 200 to decrease the pressure of hydraulic fluid within the second friction clutch 60 and thereby release the second friction clutch 60. In addition, the shift control module 118 decreases the magnitude of the commanded gear signal 194 to command the transmission 16 to shift to first gear locked.

At a time 226, the shift control module 118 starts a second attempt to shift the transmission 16 from first gear locked to second gear by increasing the magnitude of the commanded gear signal 194 to shift the transmission 16 from first gear locked to first gear freewheel. At a time 228, the shift control module 118 increases the magnitude of the commanded gear signal 194 to command the transmission 16 to shift from first gear freewheel to second gear. In addition, the shift control module 118 increases the magnitude of the delay flag signal 198 (e.g., activates a shift delay flag) to delay the application of the second friction clutch 60.

Furthermore, during a second period 230 between the time 228 and a time 232, the torque control module 120 adjusts the magnitude of the torque request signal 196 to increase the engine output torque to a torque level that is greater than a driver torque request. Immediately before and after the second period 230, the torque control module 120 adjusts the magnitude of the torque request signal 196 to the default value. In response, the ECM 70 controls the output torque of the engine 12 based on the driver torque request and independent of the torque request signal 196.

At the time 228, the torque control module 120 increases the engine output torque from the driver torque request to a third torque level in a stepped manner. During a first portion 234 of the second period 230 from the time 228 to a time 236, the torque control module 120 maintains the engine output torque at the third torque level. During a second portion 238 of the second period 230 from the time 236 to a time 240, the torque control module 120 increases the engine output torque from the third torque level to a fourth torque level at a second ramp rate and in a ramped manner. During a third portion 242 of the second period 230 from the time 240 to the time 232, the torque control module 120 decreases the engine output torque from the fourth torque level to the driver torque request in a ramped manner.

In addition, at the time 240, the shift control module 118 decreases the magnitude of the delay flag signal 198 (e.g., deactivates the shift delay flag) and increases the magnitude of the clutch pressure signal 200. The shift control module 118 increases the magnitude of the clutch pressure signal 200 to increase the pressure of hydraulic fluid within the second friction clutch 60 in order to apply the second friction clutch 60 to shift the transmission 16 to second gear. The period from the time 228 to the time 240 may be referred to as the clutch fill delay time.

The torque control module 120 may determine the third torque level, the duration of the first portion 234 of the second period 230, and the second ramp rate based on the torque converter slip and/or the number of previous attempts to shift the transmission 16 from first gear directly to second. Additionally or alternatively, the torque control module 120 may determine the third torque level and the duration of the first portion 214 of the first period 210 based on the transmission input speed, the transmission fluid temperature, and the ambient pressure. The torque control module 120 may start decreasing the engine output torque from the fourth torque level to the driver torque request when the positive torque condition is met, when the SOWC slip is greater than a positive slip threshold for a threshold period, and/or when the clutch fill delay time is greater than or equal to the clutch fill delay timeout.

In the second attempt to shift the transmission 16 from first gear locked to second gear, the number of previous attempts to do so is one. Thus, the parameters that are determined based on the number of previous attempts to shift the transmission 16 from first gear locked to second gear are different than the corresponding parameters for the first attempt. For example, the third and fourth torque levels are greater than the first and second torque levels, respectively, and the first and second portions 234 and 238 of the second period 230 are shorter in duration than the first and second portions 214 and 218 of the first period 210, respectively. These changes are made to ensure that the SOWC 24 releases during the second attempt.

Figure 6:
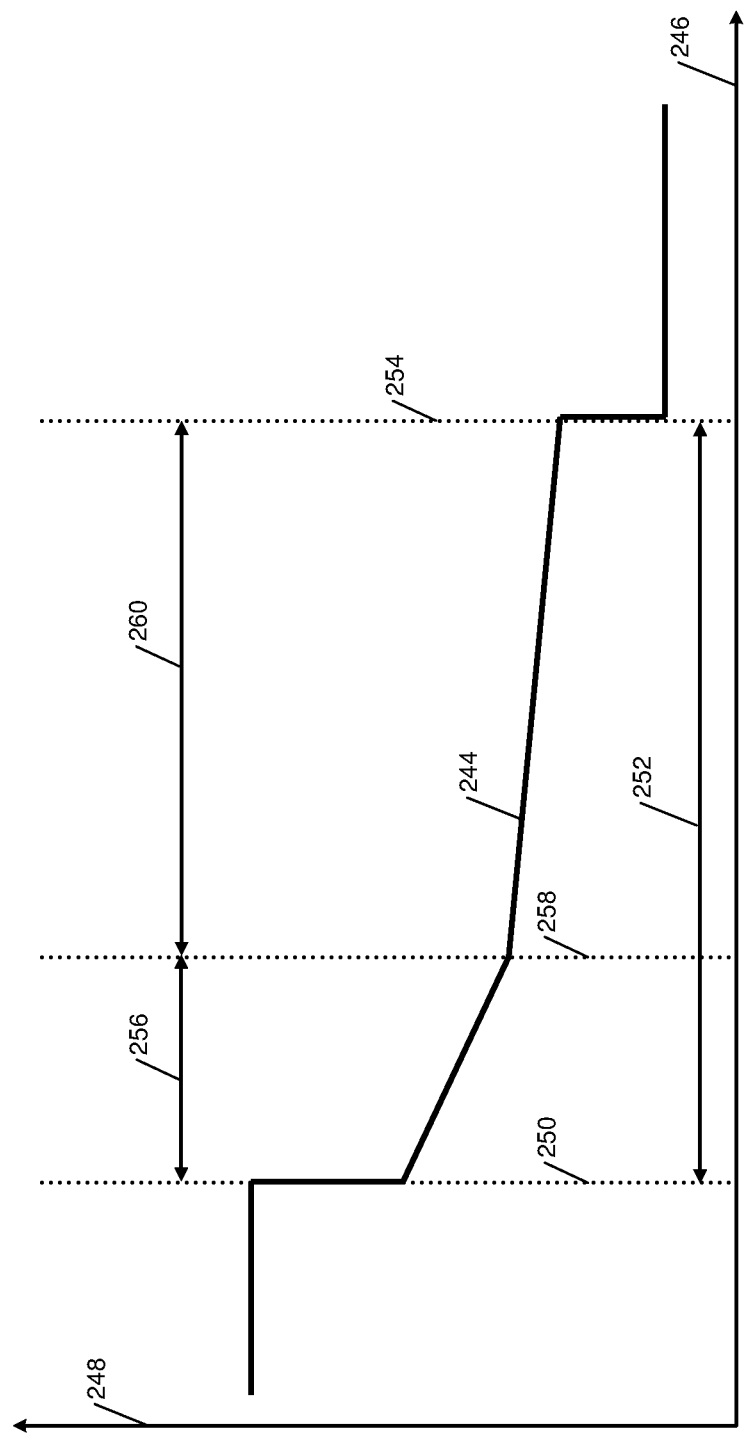

Referring now to FIG. 6, a clutch pressure signal 244 is plotted with respect to an x-axis 246 that represents time and a y-axis 248 that represents magnitude. The clutch pressure signal 244 indicates a target pressure of hydraulic fluid within the first friction clutch 58. Thus, increasing or decreasing the magnitude of the clutch pressure signal 244 respectively increases or decreases the pressure of hydraulic fluid within the first friction clutch 58 by the same amount. The portion of the clutch pressure signal 244 shown in FIG. 6 illustrates an example of how the first friction clutch 58 may be released in a ramped manner when shifting the transmission 16 from first gear to second gear through neutral.

Before a time 250, the magnitude of the clutch pressure signal 244 corresponds to a target pressure of hydraulic fluid within the first friction clutch 58 when the first friction clutch 58 is applied. The shift control module 118 decreases the magnitude of the clutch pressure signal 244 over a clutch release period 252 from the time 250 to a time 254 to gradually release the first friction clutch 58. At the time 250, the shift control module 118 starts to decrease the magnitude of the clutch pressure signal 244 by decreasing the magnitude of the clutch pressure signal 244 in a stepped manner. Then, the shift control module 118 decreases the magnitude of the clutch pressure signal 244 at a first ramp rate during a first portion 256 of the clutch release period between the time 250 and a time 258.

At the time 258, the shift control module 118 starts to decrease the magnitude of the clutch pressure signal 244 at a different rate. More specifically, during a second portion 260 of the clutch release period between the time 258 and the time 254, the shift control module 118 decreases the magnitude of the clutch pressure signal 244 at a second rate that is less than the first rate. At the time 254, the shift control module 118 decreases the clutch pressure signal 244 in a stepped manner to fully release the first friction clutch 58.

Figure 7:
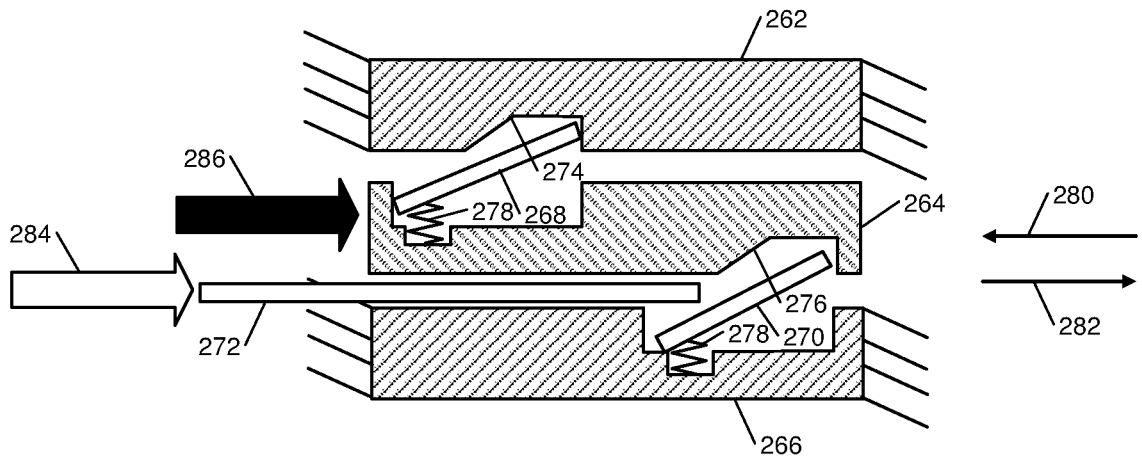
FIGS. 7 through 9 are section views of a SOWC according to the present disclosure.
Figure 8:
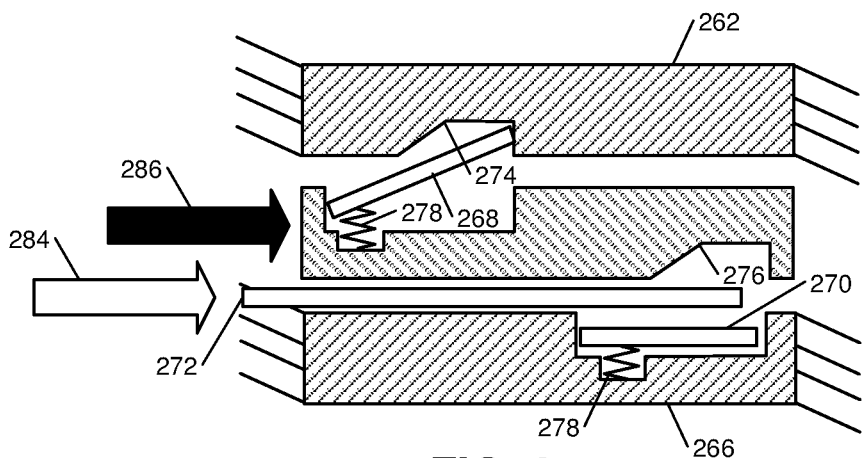
Figure 9:
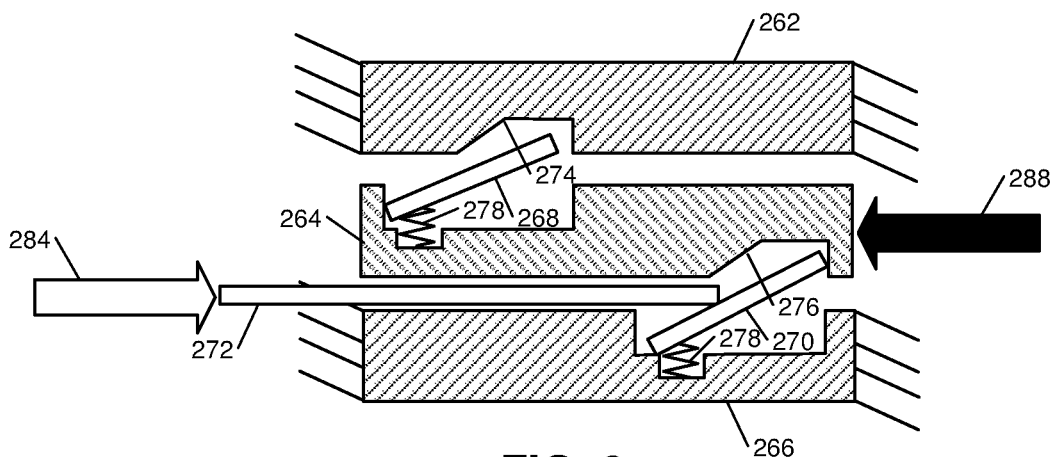

Referring now to FIGS. 7 through 9, an example implementation of the SOWC 24 is shown to illustrate why the SOWC 24 may not release in certain vehicle operating conditions. The example implementation of the SOWC 24 includes a forward notch plate 262, a forward reverse (FR) plate 264, a reverse notch plate 266, a forward strut 268, a reverse strut 270, and a selector plate 272. The forward notch plate 262 is splined to the inner diameter of the housing of the SOWC 24. The reverse notch plate 266 is fixed to the inside of the SOWC housing, the outer diameter of which is splined to the housing of the transmission 16. Thus, the forward and reverse notch plates 262 and 266 are both fixed (i.e., cannot rotate). The FR plate 264 meshes with the second ring gear 44, the third planet gear carrier 48, and the fourth planet gear carrier 54. The FR plate 264 is the only component of the SOWC 24 that can rotate.

The forward notch plate 262 defines a notch 274 that receives one end of the forward strut 268. The FR plate 264 defines a notch 276 that receives one end of the reverse strut 270. The forward and reverse struts 268 and 270 are biased by springs 278 toward the notches 274, 276 in the forward notch plate 262 and the FR plate 264, respectively.

The notche 274 is shaped so that, when the forward strut 268 is engaged with the notche 274 and the reverse strut 270 is disengaged from the notch 276, the FR plate 264 can rotate in only one direction. For example, when the forward strut 268 is engaged with the notch 274 in the forward notch plate 262 and the reverse strut 270 is disengaged from the notch 276, the FR plate 264 can rotate (e.g., free spin) in a first direction 280 relative to the forward and reverse notch plates 262 and 266, but the FR plate 264 cannot rotate in a second direction 282 relative to the forward and reverse notch plates 262 and 266. The second direction 282 is opposite of the first direction 280. However, when the reverse strut 270 is engaged with the notch 276 in the FR plate 264, the FR plate 264 cannot rotate in either one of the first or second directions 280 or 282 relative to the forward and reverse notch plates 262 and 266. SOWC slip occurs when the FR plate 264 rotates in the first direction 280 relative to the forward and reverse notch plate 262 and 266. The slip of the SOWC 24 is a difference between the speed of the forward and reverse notch plates 262 and 266 (i.e., zero) and the speed of the FR plate 264.

In FIG. 7, the SOWC 24 is in the locked state. Thus, the forward and reverse struts 268 and 270 are engaged with the notches 274, 276 in the forward notch plate 262 and the FR plate 264, respectively. As a result, the SOWC 24 transfers torque from the engine 12 to the driveline 18 and from the driveline 18 to the engine 12. In FIG. 8, the SOWC 24 is in the freewheel state. To switch the SOWC 24 from the locked state to the freewheel state, a force 284 is applied to the selector plate 272 to move the selector plate 272 in the second direction 282 and thereby force the reverse strut 270 out of the notch 276 in the FR plate 264. In turn, the reverse strut 270 cannot engage with the notch 276 in the FR plate 264. As a result, the SOWC 24 transfers torque from the engine 12 to the driveline 18, but the SOWC 24 does not transfer torque from the driveline 18 to the engine 12.

In FIGS. 7 and 8, the amount of torque transferred from the engine 12 to the transmission 16 is positive. Thus, a force 286 is applied to the SOWC 24 in the second (positive) direction 282. As a result, there is a clearance gap between the reverse strut 270 and the notch 276 in the reverse notch plate 264, which allows the selector plate 272 to force the reverse strut 270 out of the notch 276. In FIG. 9, the amount of torque transferred from the engine 12 to the transmission 16 is negative. Thus, a force 288 is applied to the SOWC 24 in the first (negative) direction 280. As a result, the reverse strut 270 is wedged between the notch 276 in the reverse notch plate 264 and the base plate 266, which may prevent the selector plate 272 from forcing the reverse strut 270 out of the notch 276 to release the SOWC 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
 a clutch control module configured to generate a release command signal to switch a selectable one-way clutch (SOWC) from a locked state to a freewheel state, wherein when the SOWC is in the locked state, a transmission transfers torque from an engine to a driveline and transfers torque from the driveline to the engine, and when the SOWC is in the freewheel state, the transmission transfers torque from the engine to the driveline and does not transfer torque from the driveline to the engine;
 a shift control module configured to generate a shift command signal to shift the transmission from a first gear to a second gear after the release command signal is generated; and a torque control module configured to increase an output torque of the engine for a first period when the shift command signal is generated.

2. The system of claim 1 wherein the torque control module is configured to:
control the output torque of the engine based on a torque request during periods before and after the first period; and
increase the output torque of the engine to a torque value that is greater than the torque request during the first period.

3. The system of claim 2 wherein the torque control module is configured to:
increase the output torque of the engine from the torque request to a first torque level in a stepped manner and maintain the output torque of the engine at the first torque level during a first portion of the first period;
increase the output torque of the engine from the first torque level to a second torque level in a ramped manner during a second portion of the first period; and
decrease the output torque of the engine from the second torque level to the torque request during a third portion of the first period.

4. The system of claim 3 wherein the torque control module is configured to:
increase the output torque of the engine at a ramp rate during the second portion of the first period; and
determine the first torque level, a duration of the first portion of the first period, and the ramp rate based on an amount of slip in a torque converter that couples the transmission to the engine.

5. The system of claim 4 wherein the torque control module is configured to determine the first torque level and the duration of the first portion of the first period further based on an input speed of the transmission, a temperature of fluid in the transmission, and an ambient pressure.

6. The system of claim 5 wherein the torque control module is configured to determine the first torque level and the ramp rate further based on a number of previous attempts to shift the transmission from the first gear to the second gear.

7. The system of claim 3 wherein the torque control module is configured to start decreasing the output torque of the engine from the second torque level to the torque request when at least one of:
an amount of torque transferred from the engine to the transmission is greater than a positive threshold torque for a first threshold period; and
an amount of slip in the SOWC is greater than a positive slip threshold for a second threshold period.

8. The system of claim 7 wherein the torque control module is configured to determine whether the amount of torque transferred from the engine to the transmission is positive based on at least one of the output torque of the engine; an input torque of the transmission, and an amount of slip in a torque converter that couples the transmission to the engine.

9. The system of claim 7 wherein the clutch control module is configured to:
apply a first clutch to engage the first gear of the transmission;
start filling a second clutch with hydraulic fluid when the shift command signal is generated; and
apply the second clutch to shift the transmission from the first gear to the second gear when the amount of torque transferred from the engine to the transmission is greater than the positive threshold torque for the first threshold period.

10. The system of claim 9 wherein when a period that elapses after the shift command signal is generated is equal to a predetermined period, the clutch control module is configured to apply the second clutch and the torque control module is configured to start decreasing the output torque of the engine regardless of whether the amount of torque transferred from the engine to the transmission is positive.

\* \* \* \* \*